Sept. 8, 1959 W. F. SCANLON 2,903,689

TELEVISION APPARATUS

Filed June 6, 1956

INVENTOR
WILLIAM F. SCANLON
BY
Norman J. O'Malley
ATTORNEY 2,903,689
Patented Sept. 8, 1959

2,903,689

TELEVISION APPARATUS

William F. Scanlon, Tonawanda, N.Y., assignor, by mesne assignments, to Sylvania Electric Products Inc., Wilmington, Del., a corporation of Delaware Application June 6, 1956, Serial No. 589,810

7 Claims. (Cl. 340—367)

This invention relates to electrical apparatus and more particularly to an adjustable magnet assembly employed in a color television receiver to provide compensation for the effects of forces such as those exerted by the earth's magnetic field on the reproduced image.

In television receivers fabricated for the reproduction of transmitted color images, the picture tubes are generally provided with a screen having red, green and blue fluorescent materials formed into groups of dot or stripe configurations. The modulated scanning beam or beams generated by the electron gun or guns of the tube theoretically land on the proper fluorescent material configuration to provide perfect registry and optimum color pure reproduction. In actual practice, this condition is not easily attained due to variations in electron travel from their expected trajectory. These variations are caused partially by electrode deformations occuring during processing, inaccuracies in tube parts, and the action of extraneous forces such as those produced by the earth's magnetic field. Very often the misregistry between the electron beam and the fluorescent configuration due to the above mentioned factors is sufficient in magnitude to cause the electron beam to land upon a different fluorescent material configuration than the one intended, thereby resulting in the reproduction of an impure color image.

Various types of structures have been successfully used in conjunction with the picture tube to reduce color impurity to a large extent. Considering particularly the effects of the earth's magnetic field on the electron beam trajectory, manufacturers of color television receivers have provided tube shields, color purity magnets, and magnetic field equalizer assemblies for use with the picture tube to reduce these effects. The color purity magnet is mounted upon the picture tube neck behind the deflection coils to provide, in part, compensation for the effects of the magnetic field existing at this position and to thereby cause the electron beam or beams to begin their travel toward the screen from a compensated or corrected position. The equalizer assembly is mounted about the periphery of the picture tube near the screen so that the earth's field and other extraneous magnetic fields existing in the vicinity of the screen can be compensated for by the permanent magnets mounted on this assembly.

Since the vertical component of the earth's magnetic field varies geographically throughout the Northern Hemisphere, and since the horizontal component of this field varies with the horizontal orientation of the picture tube at a given geographical location, these magnets must be adjusted in strength to account for all conditions of receiver positioning. Consequently, the magnets must be easily accessible to television servicemen due to the large number and frequency of adjustments required.

One proposed structure for making the equalizer assembly magnets accessible without removing the receiver chassis employs a television cabinet having a removable top cover member. However, in order to make the adjustments of the magnets disposed on the periphery of the tube below the mid-portion of the cabinet, the serviceman must reach around and sometimes beneath the tube. This procedure is awkward due to the confined space, and it is difficult to adequately observe the screen while such adjustments are being made. In addition, the receiver is operating during the adjustment process, and the serviceman is exposed to 25,000 volts or more in the immediate vicinity of the tube where he is manipulating the magnetic adjustable elements. This servicing dilemma is increased with each step forward in the present trend of providing larger color picture tubes and smaller cabinets.

Accordingly, it is an object of the invention to reduce the aforementioned difficulties, and to provide an improved television apparatus employing easily adjustable equalizer magnets.

A further object is the provision of a magnet assembly adjustable from a position remote from the magnet structure.

A still further object is the provision of an improved adjustable magnet and magnet assembly.

The foregoing objects are achieved in one aspect of the invention by the provision of a magnetic field equalizer assembly employing adjustable magnets which have a structure adapted to be controlled from a position remote from the position of the magnet structure.

For a better understanding of the invention, reference is made to the following description taken in conjunction with the accompanying drawings in which.

Figures 1, 2, 3, 4, 5:
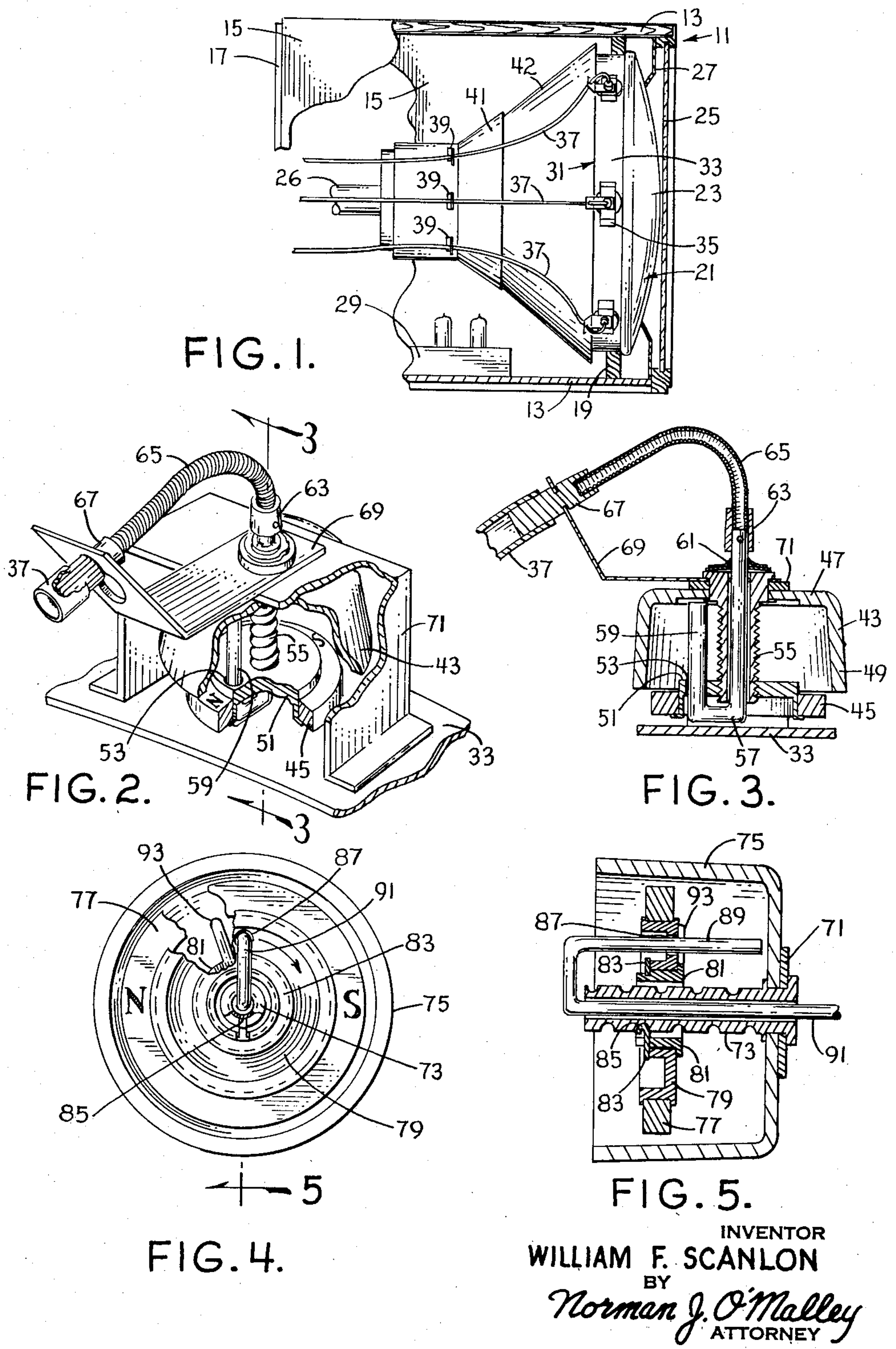
Fig. 1 is a partial section of a television cabinet and chassis employing a magnet assembly constructed in accordance with one embodiment of the invention.
Fig. 2 is a partial perspective view showing an embodiment of a magnet assembly.
Fig. 3 is a section taken along line 3—3 of the view shown in Fig. 2.
Fig. 4 is a plan view of another embodiment of the magnet assembly shown in Fig. 2.
Fig. 5 is a section taken along line 5—5 of the view shown in Fig. 4.

Referring to Fig. 1, a television cabinet 11 is shown with top and bottom panels 13, side walls 15, and a back panel 17. Mounted upon studs 19, which are disposed adjacent the front section of cabinet 11, is a picture tube 21. The viewing screen 23 of the tube is positioned adjacent the face plate 25 of cabinet 11. A mask 27 is attached to the forward edge of cabinet 11 and is formed to contact one portion of the exterior surface of screen 23. The apparatus is provided with a horizontally disposed chassis 29 which is shown supported upon the bottom panel 13 of the cabinet.

Mounted about the periphery of picture tube 21 at its forward position near screen 23 is a magnetic field equalizer assembly 31 comprising a non-magnetic flat metal band or support member 33 and adjustable magnet assemblies 35. Generally, six or eight of these magnets are arranged on band 33 equi-distant from one another so as to be symmetrically disposed about screen 23. Therefore, they are in a position to afford the most effective magnetic field compensation. Connected to the rotatably adjustable members of magnet assemblies 35 to be hereinafter described are flexible remote control shafts 37. These shafts extend rearward of the assemblies 35 along the neck 26 of picture tube 21 to a position which is adjacent or beyond back panel 17 of cabinet 11. Shafts 37 are held in position and in proper alignment relative to one another by clips 39 which are mounted upon a sleeve 41 formed to surround the junction of neck portion 26 and the flared portion of a tube shield 42. The clips are preferably provided with a base section, which is affixed to the sleeve, and with a support section extending from the base section and having an aperture formed therein. The shafts 37 extend through the apertures, and are loosely confined by the walls of the aperture so that they may be retained in position but easily rotated.

Picture tube 21 and its attached equalizer assembly 31 are mounted in close proximity to panels 13, side walls 15, and face plate 25. Therefore, the spacing intermediate these cabinet closure members and the magnet assemblies 35 is limited. The provision of remote controls for the magnet assemblies thereby provides an easy and efficient means for adjustment of the magnets.

Figs. 2 and 3 show one embodiment of an adjustable magnet of the type designated in Fig. 1 by the numeral 35. The magnetic field producing parts of the assembly comprise a magnetic field shunting member 43 and a centrally apertured disc-shaped magnet 45. The strength of the field produced by this device is determined by the position of magnet 45 relative to the confines of member 43, which is formed with a base portion 47 and a continuous wall portion 49. The field strength of the magnet in the regions external to the device decreases progressively as the magnet is moved into the confines of shunting member 43.

Magnet 45 is mounted upon the external surface of a support member 51, which has a centrally disposed aperture and a slot 53 located intermediate the central aperture and its external surface. The aperture walls are formed with screw threads or ridges to provide means for moving magnet 45 coaxially with shunting member 43.

A hollow spindle 55 is centrally positioned within base portion 47 of member 43. The spindle has an external spiral groove formed on the section which extends from base portion 47 coaxially with shunting member 43. The groove on spindle 55 and support member 51 cooperate to provide the rotational and coaxial movement of magnet 45 relative to the shunting member.

A drive shaft 57 extends through hollow spindle 55 and is formed with a reverse bend to provide a terminal portion 59 lying substantially parallel to hollow spindle 55. The terminal portion passes through slot 53 in support member 51 to provide means for imparting rotational movement for the magnet when a force is exerted against the wall of slot 53 by shaft 57. This slot wall thereby serves as a cam surface which provides the rotative movement for the device. Since terminal portion 59 is axially aligned with the walls of slot 53, the support member 51 and its attached magnet 45 are free to move in a coaxial relationship with member 43.

The drive shaft 57 of the assembly is rotatably affixed to spindle 55 by means of mounting spring 61. Attached to the end of shaft 57 by means of a sleeve 63 is a flexible linkage 65. This linkage is connected at its opposite end to the bushing 67, which is held in position relative to shunting member 43 by means of a mounting plate 69. Extending from bushing 67 is the remote control shaft 37, whose mounting position is shown more clearly in Fig. 1. This shaft may be made of any flexible material such as a plastic sleeve. The magnetic assembly is mounted upon band 33 by means of bracket 71. With a magnet assembly of the type described above, a rotative movement imparted to the end of remote control shaft 37 will cause linkage 65 and drive shaft 57 to rotate and thereby cause magnet 45 to move relative to shunting member 43.

Figs. 4 and 5 illustrate another embodiment of the magnet assembly adapted to be employed with an equalizer assembly similar to the one shown in Fig. 1. The magnet assembly is provided with a hollow spindle 73 which has an external spiral groove and is supported upon a magnetic field shunting member 75. The magnet 77 employed with the device is mounted upon a support member 79, which is in turn slidably affixed to a toggle bushing 81 and its attached washer 83. One section of the washer has an appendage 85 which travels in the groove of spindle 73. Support member 79 has a slot 87 through which the terminal portion 89 of a drive shaft 91 extends. Rotation of this drive shaft causes terminal portion 89 to abut the wall of slot 87 and thereby cause rotation of support member 79 and its associated magnet 77. Toggle 93, which is part of bushing 81, extends laterally of hollow spindle 73 above the upper surface of support member 79 so that it may intercept terminal portion 89. Since support member 79 is slidably mounted upon bushing 81, a rotation of shaft 91 will rotate the support member, but not the bushing, until such time as terminal portion 89 engages toggle 93. Thereafter, further rotation of the drive shaft will cause bushing 81 and its affixed washer 83 with appendage 85 to turn, and thereby move the magnet 77 coaxially with respect to shunting member 75.

Referring particularly to Fig. 4, magnet 77, which is polarized radially, may thereby be rotated approximately 360° without any axial movement. Therefore, after the proper field strength is attained during axial adjustment, the polarity of the field at that given field strength may be acquired with exactness by orientation of the polarity of the magnet 77.

The application of adjustable magnets of the type described herein to a color television picture tube provides a convenient means for adjusting the direction and magnitude of the compensating force used to counteract the effects of the earth's magnetic field on the reproduced color image.

Although several embodiments of the invention have been shown and described, it will be apparent to those skilled in the art that various changes and modifications may be made therein without departing from the scope of the invention as defined by the appended claims.

What is claimed is:

1. In a television apparatus, the combination comprising a cabinet having side walls, a face plate, and a back panel, a picture tube with a neck portion and a flared portion terminating in a viewing screen mounted in said cabinet with said screen in close proximity to said side walls and face plate, a support member positioned adjacent said viewing screen, a plurality of adjustable magnet assemblies mounted upon said support member, said assemblies comprising a magnet, a magnetic field shunting member, and a drive shaft rotatably mounted on said shunting member formed to provide movement of the magnet relative to said shunting member, and flexible remote control shafts extending from each of said drive shafts to substantially follow the contour of said flared and neck portions and reach a position adjacent said back panel, said assemblies being adapted to provide adjustment of the magnetic field strength exerted by said magnet in the vicinity of said screen by manipulation of said control shafts.

2. In a television apparatus, the combination comprising a cabinet having side walls, a face plate, and a back panel, a picture tube with a neck portion and a flared portion terminating in a viewing screen mounted in said cabinet with said screen in close proximity to said side walls and face plate, a support band positioned adjacent and circumscribing said viewing screen, a plurality of adjustable magnet assemblies mounted equidistant from one another upon said support band, said assemblies comprising a magnet, a support member for said magnet formed with a cam surface, a magnetic field shunting member, and a drive shaft rotatably mounted on said shunting member for operation on said cam surface to provide movement of the magnet relative to said shunting member, and flexible remote control shafts extending from each of said drive shafts to a position adjacent said back panel, said assemblies being adapted to provide adjustment of the magnetic field strength exerted by said magnets in the vicinity of said screen by manipulation of said control shafts.

3. An adjustable magnet assembly comprising a magnetic field shunting member having a base portion and a continuous wall portion, a drive shaft extending from said base portion, a disc-shaped magnet, and a support member for said magnet mounted coaxially with said shunting member formed with a cam surface, said drive shaft being formed to operate on said cam surface to provide coaxial movement of the magnet relative to said shunting member.

4. An adjustable magnet assembly comprising a magnetic field shunting member having a base portion and a continuous wall portion, a hollow spindle formed with an external spiral groove mounted upon said base portion and extending therefrom coaxially with said wall portion, a disc-shaped magnet, a support member for said magnet disposed about said spindle having a slot whose wall defines a cam surface and means for effecting movement of said magnet coaxially with said shunting member in accordance with said spiral groove, and a drive shaft extending through said hollow spindle having a reverse bend providing a terminal portion which extends through said slot and operates on said cam surface to impart movement to said magnet upon rotation of the drive shaft.

5. An adjustable magnet assembly comprising a magnetic field shunting member having a base portion and a continuous wall portion, a hollow spindle formed with an external spiral groove mounted upon said base portion and extending therefrom coaxially with said wall portion, a disc-shaped magnet, a support member for said magnet disposed about said spindle having a slot whose wall defines a cam surface and ridges adapted to mesh with said spindle groove to effect movement of the magnet coaxially with said shunting member, and a drive shaft extending through said spindle having a reverse bend providing a terminal portion formed to operate on said cam surface to impart movement to said magnet upon rotation of the drive shaft.

6. An adjustable magnet assembly comprising a magnetic field shunting member having a base portion and a continuous wall portion, a hollow spindle formed with an external spiral groove mounted upon said base portion and extending therefrom coaxially with said wall portion, a disc-shaped magnet, a support member for said magnet disposed about said spindle having a slot whose wall defines a cam surface, and a drive shaft extending through said hollow spindle having a reverse bend providing a terminal portion formed to operate on said cam surface to impart movement to said support member in accordance with said spiral groove upon rotation of the drive shaft.

7. An adjustable magnet assembly comprising a magnet field shunting member having a base portion and a continuous wall portion, a hollow spindle formed with an external spiral groove mounted upon said base portion and extending therefrom coaxially with said wall portion, a washer disposed about said spindle having an appendage formed to travel in said groove, a bushing affixed to said washer with a toggle extending laterally away from said spindle, a disc-shaped magnet, a support member for said magnet slidably affixed to said bushing and having a slot whose wall defines a cam surface, and a drive shaft extending through said hollow spindle having a reverse bend providing a terminal portion formed to operate on said cam surface to effect rotative movement of said magnet and on said toggle to effect axial movement of said magnet along said spindle.

References Cited in the file of this patent

UNITED STATES PATENTS

| | | |
|---|---|---|
| 2,513,221 | Webb | June 27, 1950 |
| 2,541,446 | Trott | Feb. 13, 1951 |
| 2,568,631 | Hoellerich | Sept. 18, 1951 |
| 2,591,159 | Kabuss | Apr. 1, 1952 |
| 2,733,434 | Leonard et al. | Jan. 31, 1956 |
| 2,816,244 | Hillegass | Dec. 10, 1957 |
| 2,825,835 | Heppner | Mar. 4, 1958 |